Oct. 3, 1939.　　　C. A. OLSON　　　2,174,861

VALVE

Filed Jan. 29, 1938　　　2 Sheets-Sheet 1

Inventor:
Charles A. Olson
By: Joseph O. Lange
Atty.

Oct. 3, 1939.　　　　C. A. OLSON　　　　2,174,861
VALVE
Filed Jan. 29, 1938　　　2 Sheets-Sheet 2
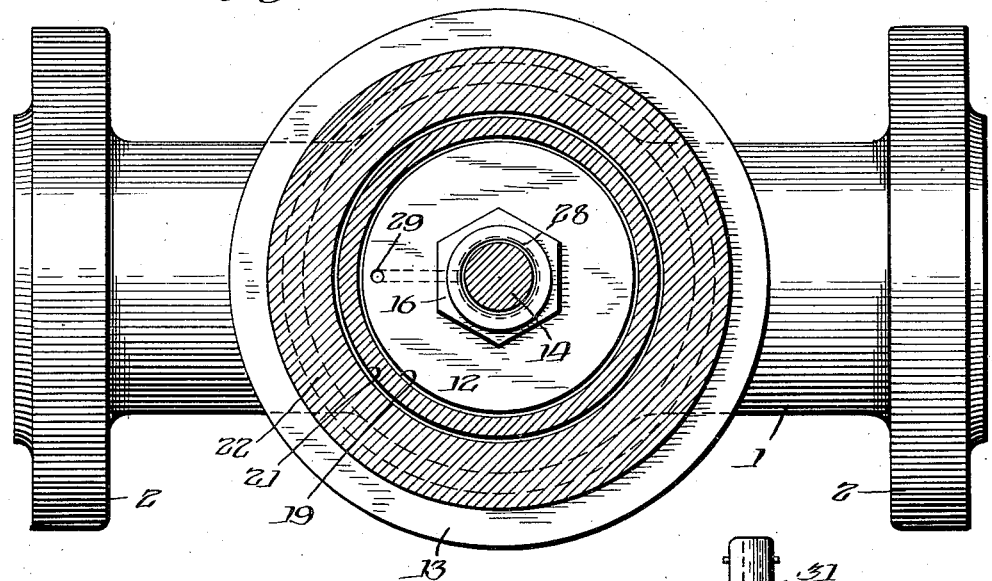
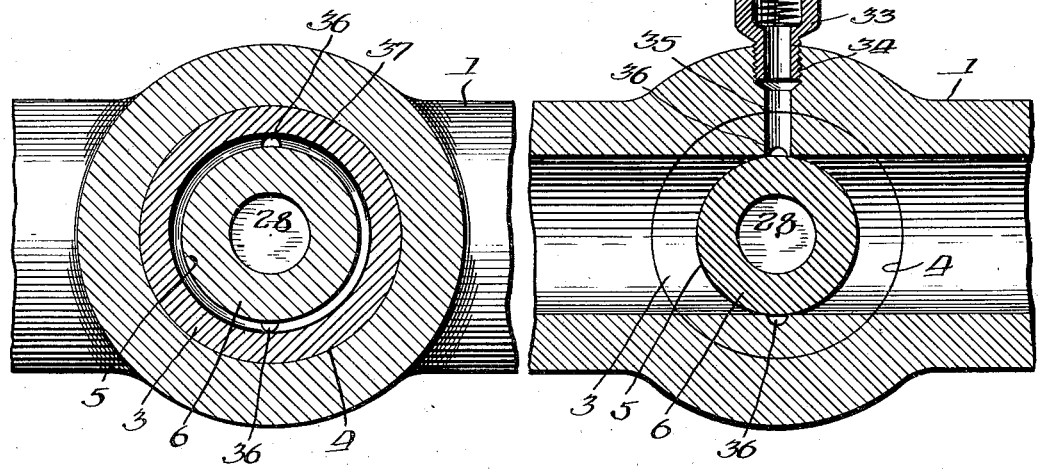
Inventor:
Charles A. Olson
By: Joseph O. Lange
Atty.

Patented Oct. 3, 1939

2,174,861

UNITED STATES PATENT OFFICE 2,174,861

VALVE

Charles A. Olson, Geneva, Ill., assignor to Crane Co., Chicago, Ill., a corporation of Illinois Application January 29, 1938, Serial No. 187,648

3 Claims. (Cl. 251—59)

My invention relates to a valve of the reciprocably movable, frusto-conical plug type in which the bearing surface is preferably lubricated so as to provide for a pressure-tight supplementary seal when the swivelable closure member is in the seated or closed position. This invention constitutes an improvement over the previous construction in which this applicant was a co-inventor, and which application was filed in the U. S. Patent Office on March 18, 1937 and is identified as Serial No. 131,579.

One of the inherent difficulties with the former construction resided in the fact that the frusto-conical valve closure member was not lubricated nor was it balanced, and as a result considerable effort was frequently required in operating the plug or closure member because of the dragging effect which line pressure and friction exerted upon the said member during its course of reciprocating movement within the valve casing from open to closed position and return.

It is, therefore, a principal object of this invention to provide in a valve of the character hereinafter described, a frusto-conical form of valve closure member in which the reciprocably movable plug is balanced against line pressure in a simple but effective manner and is also provided with suitable lubricating means in order to overcome the previous objectionable tendencies referred to.

Another important object lies in the provision of a valve in which the sleeve-like tapered seat cage member, having readily available means for supplying lubricant to the bearing surfaces thereof and to the valve closure member, may be conveniently renewed or inspected.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Fig. 2 is a section taken on the line 2—2 of Fig. 1.

Fig. 3 is a section taken on the line 3—3 of Fig. 1.

Fig. 4 is a section taken on the line 4—4 of Fig. 1.

Similar reference characters refer to like parts throughout the various views.

Figure 1:
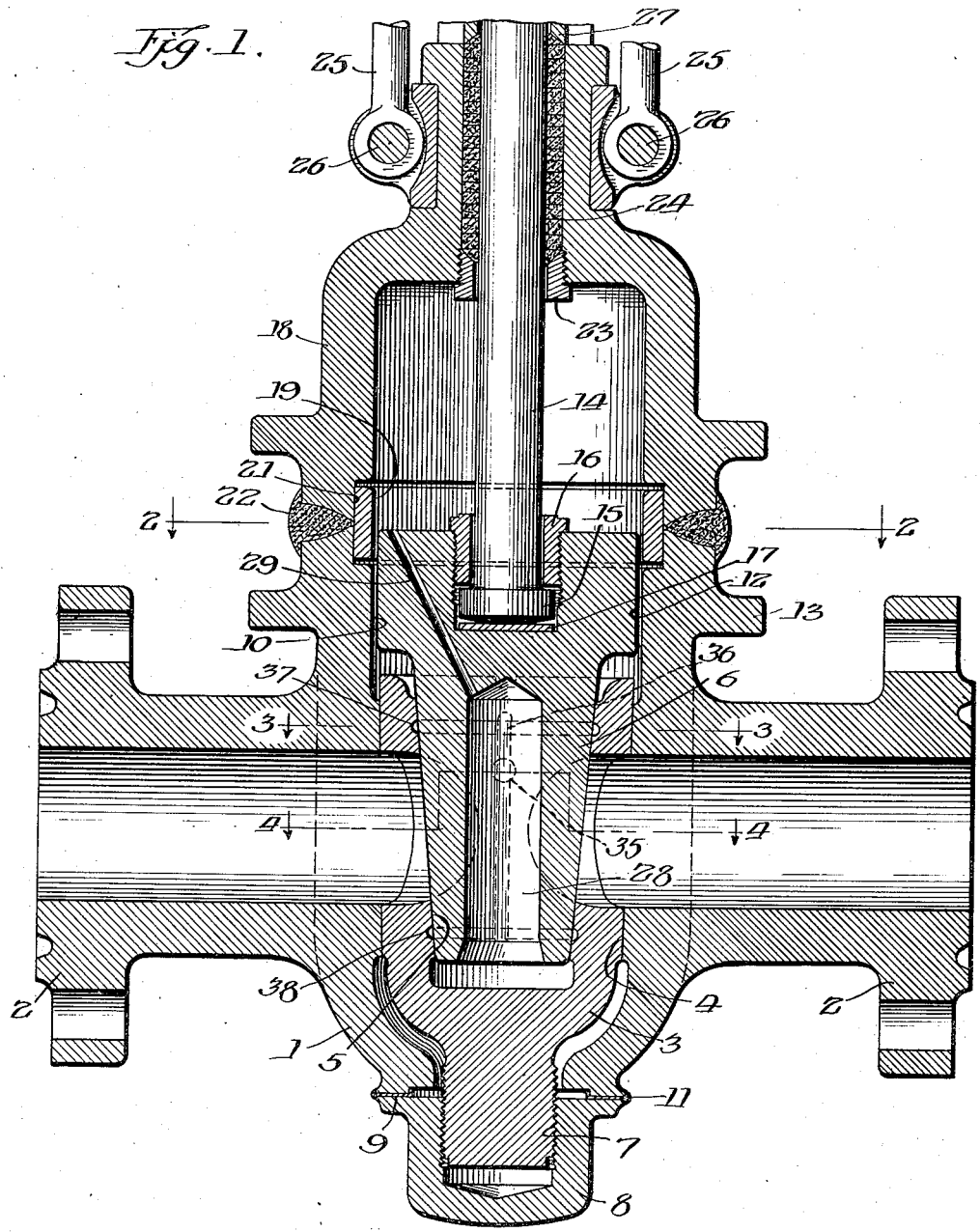
Fig. 1 is a fragmentary sectional view showing the assembled relation of the parts forming a valve comprising the essential elements of my invention.

Referring now to Fig. 1, the valve casing 1 is provided with the usual connecting end flanges 2 suitable for connection with a pipe line and which, of course, may be made of any desired form for connection with a pipe line, as for example, in screwed, brazed or welded ends and the like, to suit the installation. The valve casing is provided with a tapered seat cage member 3 preferably of frusto-conical form engaging like extending surfaces 4 of the casing 1 and being provided with the complementary tapering surfaces 5 for surface engagement by the frusto-conical seating member 6. In order to position the cage member properly within the casing 1, the lower portion of the said cage member is provided with a threaded shank 7 which is suitably engaged by a threaded nut 8. The latter member shoulders as at 9 and is preferably weld sealed as at 11, for purpose of insuring greater security against leakage of line fluids, thereby maintaining the cage member 3 in axially immovable and non-rotatably fixed position. The hollow closure member 6 is suitably guided at its upper portion by means of a cylindrical enlarged portion 12 for slidable engagement with the upper portion 10 of the casing bonnet flange 13. By a conventional connection the closure member 6 is attached to the reciprocably moving stem 14 by means of the shouldered stem head 15 and the disc stem ring 16, the stem head preferably bearing against the thrust washer 17, as indicated.

For the purpose of making a positive connection with the valve casing 1 adjacent to the bonnet flange 13, a guide ring 19 having a relatively smooth periphery over which the bonnet 18 fits snugly, as at 21, is weld sealed, as at 22, thereby providing a quick, convenient leaf-proof joint reinforced by the ring 19. This type of welded joint likewise provides for a sturdy, easily assembled connection, allowing for the necessary expansion and contraction due to line temperature changes. The stem 14 is journalled in the usual manner within the bonnet 18 by means of the stem hole bushing 23 forming also the lower portion of the stuffing box 24. The bonnet is suitably provided with the gland bolts 25 pivotally anchored, as at 26, to provide for the necessary compression of the packing within the stuffing box 24. In combination therewith a conventional packing gland 27 is shown in fragmentary section. The necessary valve parts such as the stem threads, the operating handwheel, the yoke sleeve and the like, have not been deemed to be necessary to illustrate, since these parts are of the usual kind employed in a reciprocating valve operating mechanism, the details of which are well known to any one skilled in this art.

It is considered desirable in pipe lines in which considerable solid matter may be carried to provide that the valve closure member 6 is made with a hollow or relieved central portion or chamber 28, within which latter chamber the solid matter may accumulate or be packed or absorbed should the occasion or condition warrant, thereby not interfering with or preventing the proper seating of the closure member.

In order to avoid the trapping of line fluid pressure within the closure member chamber 28, the latter is provided with a duct 29 leading to the lower interior portion of the bonnet thereby obtaining a balanced pressure condition between the space portions above and below the closure member 6, when the latter is seated or at any time during its course of movement. It is further evident that, depending upon the size of the relieved portion 28, the closure member 6 may also be made relatively flexible so as to better adapt itself to the frusto-conical form of seating contact which it makes with the cage member 3. This resilient construction is particularly advantageous in accomplishing the more thorough and uniform distribution of pressure lubrication of the seating surfaces as hereinafter described in greater detail.

As shown more clearly in Fig. 4, in a valve of this type it is desirable to provide the seating surface of the valve when in its closed position with convenient lubricating means functioning as a further seal against line leakage, and in accordance with the present conception a conventional alemite connection 31 may be used for attachment to the well known grease gun, the fitting being provided with a spring loaded ball check valve 32 and the grease passage 33. The fitting threadedly attaches to the casing 1, as at 34, and its form obviously may vary considerably from that shown, depending upon the degree of severity of the pressure condition encountered. The lubricator fitting, as indicated, is connected to a feed duct 35 passing horizontally through the walls of the casing 1 and of the cage 3, connecting at its innermost limit with a vertically extending groove 36 inscribed upon the inner tapered peripheral surface 5 of the cage member 3. It will be readily apparent that the size and arrangement of lubricant grooving may be modified considerably from the type of grooving shown, for the purpose of contributing to more improved circulation of the lubricant which may be oil or grease, as conditions require. As illustrated, the vertical grooves 36 are preferably connected with peripherally extending grooves at the top and bottom, as indicated at 37 and 38, respectively.

To those skilled in this art it is apparent that only a single preferred embodiment of my invention has been illustrated and described. It should, therefore, be clear that the invention is capable of numerous structural modifications. For example, in some instances, especially in connection with small size valves, it may be desirable to dispense with a separate cage member 3 by making the latter integral with the casing 1. Also under similar circumstances, the closure member and stem may be made integrally thus eliminating the use of the disc stem ring member 16.

I desire, therefore, to be limited only to the extent of the claims appended hereto.

I claim:

1. In a lubricated reciprocably movable plug valve comprising a casing, bonnet means for the said casing, a renewable cage member within the said casing, a closure member therefor of frusto-conical form seating within the said cage member, weld sealed means connecting the said bonnet means with the said casing and comprising independent annularly positioned guide means for the alignment of the said bonnet means with the casing, the said guide means cooperating with the said weld sealed means to form a portion of the guide bearing for the said closure member when moving between the said casing and the said bonnet means.

2. In a lubricated reciprocably movable plug valve comprising a casing, a bonnet weldably attached to the said casing, a renewable cage member non-rotatably positioned within said casing, a swivelable closure member therefor of frusto-conical hollow form seating within the said cage member and having an upper enlarged cylindrical portion for peripheral guidance within said casing and said bonnet, relieved chambers within said bonnet and casing respectively for guiding said cylindrical portion, a renewable ring forming a part of the said weldable attachment for guiding the said closure member in its reciprocable movement between the said casing and the said bonnet.

3. In a reciprocably movable valve comprising a casing, bonnet means for the said casing, a closure member within the said casing, weld sealed means connecting the said bonnet means with the said casing and comprising independent annularly positioned guide means for the alignment of the said bonnet means with the said casing, the said guide means cooperating with the said weld sealed means to form a portion of the guide bearing for the said closure member when moving between the casing and the said bonnet means.

CHARLES A. OLSON.